May 19, 1964 R. S. WEBB Re. 25,580

HYDRAULIC SERVO FEED

Original Filed March 16, 1960 3 Sheets-Sheet 1

INVENTOR.
Robert S. Webb.
BY M K Murphy
ATTORNEY.

May 19, 1964

R. S. WEBB

Re. 25,580

HYDRAULIC SERVO FEED

Original Filed March 16, 1960

3 Sheets-Sheet 2

INVENTOR.

BY Robert S. Webb.

M K Murphy

ATTORNEY.

HYDRAULIC SERVO FEED

Original Filed March 16, 1960 3 Sheets-Sheet 3

INVENTOR.
ROBERT S. WEBB
BY M K Murphy
ATTORNEY

United States Patent Office

Re. 25,580
Reissued May 19, 1964

25,580
HYDRAULIC SERVO FEED

Robert S. Webb, Bloomfield Hills, Mich., assignor to Elox Corporation of Michigan, Troy, Mich., a corporation of Michigan Original No. 2,984,761, dated May 16, 1961, Ser. No. 15,505, Mar. 16, 1960. Application for reissue Sept. 17, 1962, Ser. No. 224,609
24 Claims. (Cl. 314—61)

Matter enclosed in heavy brackets [ ] appears in the original patent but forms no part of this reissue specification; matter printed in italics indicates the additions made by reissue.

This invention relates to electrical discharge machining and particularly to improved power feed means for controlling the feeding of the machining electrode.

Application of electrical discharge machining, sometimes called E.D.M., to the machining of large workpieces has required considerable redesign of the feeding and positioning mechanism for the electrodes which have become increasingly heavy and bulky. Electro-hydraulic servo feeds now in common use, and a sensing circuit is used to monitor the position of the electrode with respect to the workpiece at all times and to sense conditions in the machining gap, thereby to cause advance or retraction of the electrode as the occasion demands.

The principal object of this invention is to provide a more reliable and less costly control "package" for the power feed of the E.D.M. apparatus.

Another object is to improve the operating characteristics of the power feed mechanism particularly with respect to tendency of the electrode to overtravel on downfeed and lag in recovery after backup, especially when heavy electrodes are involved.

Other objects and advantages will become apparent from the following specification which, in conjunction with the accompanying drawings, discloses a preferred form of the invention.

In the drawings, in which reference characters have been used to designate like parts referred to herein:

Figure 1:
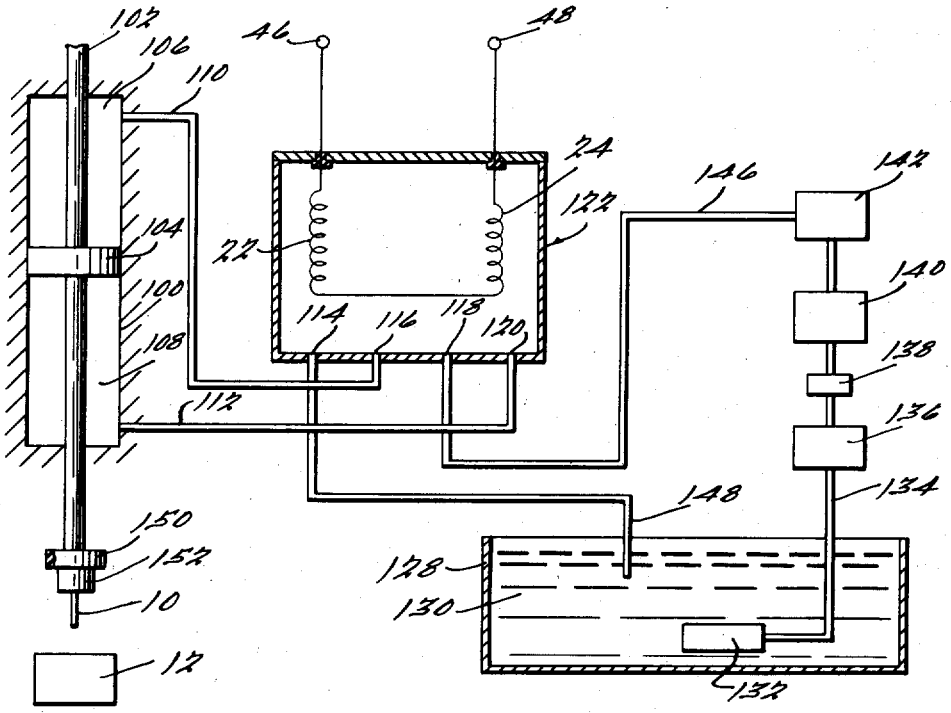
FIG. 1 is a schematic showing of a typical hydraulic power feed mechanism for an E.D.M. electrode.
Figure 2:
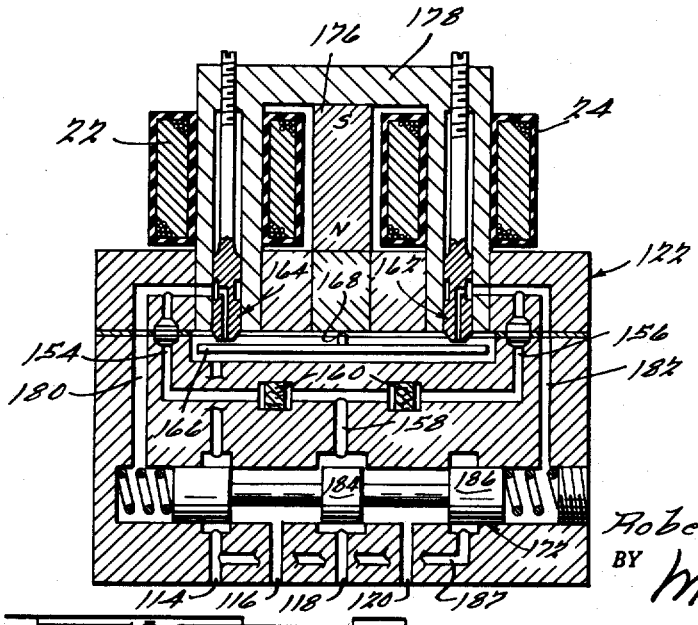
FIG. 2 is a sectional view of one form of hydraulic control valve suitable for use in the FIG. 1 mechanism.

Referring to FIGS. 1 and 2, it will be seen I have shown a machining electrode 10 disposed in spaced relationship to a workpiece 12. The electrode 10 may weigh a few ounces or several hundred pounds and may be of almost any shape depending upon the hole or cavity to be machined. It is held in a collet 152 carried by an insulating plate 150. The latter is carried by a piston rod 102 attached to piston 104 which is reciprocable in a cylinder 100. The cylinder is rigidly mounted on the column of the E.D.M. apparatus (not shown), and fluid flow to and from the cylinder is regulated by a valve generally designated by numeral 122 and shown in detail in FIG. 2.

The fluid circuit comprises a reservoir 128 which contains fluid 130. The fluid is drawn through screen 132 through input suction line 134 by pump 136. The pump, which operates in a range of from 500 to 3000 p.s.i., forces the fluid through check valve 138 and filter 140 to accumulator 142, which stores hydraulic pressure and eliminates surging. Pressure line 146 connects with input port 118 of valve 122. The hydraulic circuit is completed by the valve through the cylinder 100 and fluid is exhausted through valve exhaust port 114 into line 148 which leads to the reservoir 128.

As may be seen in FIGS. 1 and 2, the valve 122 has a pair of electrically energizable coils 22, 24, which may be connected in series, parallel or in "push-pull," it being necessary only to correctly phase the coils such that the desired operation is obtained with a reversal of polarity across them. In this instance, the coils are connected in series.

The valve 122 is a two-stage valve and embodies a sensitive first stage and a second stage which is operable in response to operation of the quickly responsive first stage. In other words, the valve is an amplifying valve which applies relatively high fluid pressures to the cylinder 100 in response to relatively low differential pressures developed in the first stage.

The first or electrically operated stage is controlled by the flapper 166. This flapper is pivotally mounted at 168 and its position is governed by permanent magnet 176 and by the coils 22 and 24 which add or subtract flux in accordance with the energization thereof.

The lands of the valve spool 172 are so proportioned that in the null condition illustrated, sufficient clearance is provided such that a leakage flow of from 10% to 20% of normal flow is permitted through the valve. That is to say, fluid flows through pressure port 118, around portion 184, through passage 158, filters 160, passages 154 and 156 to nozzles 162, 164. Passages 180, 182, and ports 116, 120, are open to this flow, but inasmuch as the valve is balanced, no action results.

Energization of coils 22, 24, in one direction or the other will cause flapper 166 to be attracted toward nozzle 162 or 164, and control action of the valve will be initiated. Let it be assumed that the flapper 166 is attracted toward nozzle 164 and away from 162, this corresponding to downfeed of electrode 10. As flapper 166 moves toward nozzle 164, increased pressure is developed in passage 180, and pressure is reduced in passage 182. Valve spool 172 is thereby moved to the right. This exposes port 116 to full system pressure through port 118 and port 120 is opened to exhaust 114 by movement of land 186 to uncover passage 187. Thus pressure is increased at port 116 and reduced at port 120 and piston 104 will downfeed electrode 10.

When electrode backup or retraction is signalled by the sensing circuit described below, coils 22, 24, are oppositely polarized and opposite movement of flapper 166 causes increased pressure on port 120 and exhaust on port 116.

Other types of two stage valves may be used. Two commercially obtainable valves which work satisfactorily are Vickers model A–13051 and Pegasus model 120G.

Figure 3:
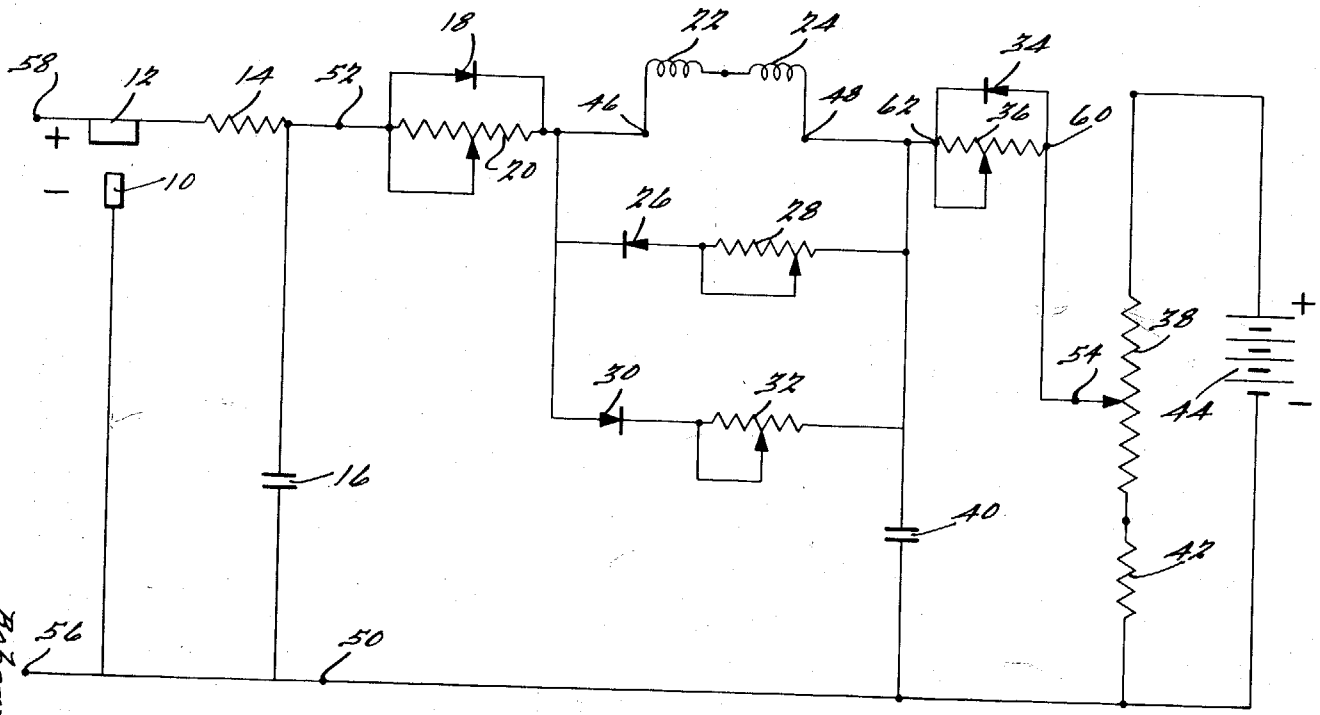
FIG. 3 is a schematic wiring circuit for automatic control of the power feed mechanism.

Reference is now made to FIG. 3 which shows the control circuit for coils 22, 24. In FIG. 3, the electrode 10 and workpiece 12 are connected across an E.D.M. supply of direct current voltage represented by terminals 56, 58. The power supply is assumed to be adequate to supply the necessary voltage for causing discharge across the gap between the electrode and workpiece in accordance with the characteristic of the power control circuit. A preferred form of power supply is shown and described in my *U.S. Patent No. 3,062,985, issued on November 6, 1962* [copending application Serial No. 747,078, filed July 7, 1958].

A sensing network comprising a resistor 14 and a condenser 16 is connected across the machining gap. This is a standard sensing network which presents at terminals 50, 52, the average voltage prevailing across the gap.

The terminal 50 is, in this instance, connected to the negative side of a reference voltage source 44. The terminal 52 is connected through a *rheostat* [potentiometer] 20 to valve coil terminal 46. The *rheostat* [potentiometer] 20 is shunted by a diode 18 for a purpose to be described.

The reference voltage 44 is connected in parallel with a potentiometer 38, a limiting resistor 42 being connected in series. The latter is included because operation of this circuit at voltages below 20 volts is unsatisfactory in most instances.

Valve control coils 22, 24, are connected in series between terminals 46, 48, and the latter is connected through a *rheostat* [potentiometer] 36 with terminal 54 which is the adjustable voltage terminal of the potentiometer 38. The *rheostat* [potentiometer] 36 is shunted by a diode 34.

A *rheostat* [potentiometer] 38 is series connected with a diode 26 across the terminals 46, 48, and a parallel *rheostat* [potentiometer]-diode combination 32, 30, is similarly connected, the diode 30 being of oppositely polarity to the diode 26. The circuit is completed by the condenser 40 which connects the terminal 48 with terminal 50.

In this circuit, the difference in voltage between terminal 52 which measures the average input voltage at the working gap, and terminal 54 which measures the preset balance reference voltage, is presented to the coils 22, 24, for controlling the electrode position. Actually, *rheostats* [potentiometers] 20, 36 and *potentiometer* 38 are "ganged" together to form the gap reference voltage. *The common operating means for rheostats 20, 36, and potentiometer 38 comprises a control means for selectively presetting the reference voltage magnitude through potentiometer 38 and conjointly inversely varying the resistances of rheostats 20 and 36, respectively.*

As an example of the operation of the device, consider a condition wherein the voltage at point 52 is in excess of that at point 54. Electron flow then will be from point 54, through *rheostat* [potentiometer] 36 (diode 34 blocking shunt flow), coils 24, 22, and diode 18 to averaging sensing network 14, 16. This will cause operation of valve 122 to downfeed the electrode 10 as explained above. *Rheostat* [Potentiometer] 36 limits electron flow from terminal 54 to terminal 52, [potentiometer] *rheostat* 20 being shorted by diode 18 during this phase of electron flow. During this phase [potentiometer] *rheostat* 32 and diode 30 are in shunt with coils 22, 24; thus the setting of [potentiometer] *rheostat* 32 determines the level of excitation of the coils and the velocity of the downfeed of the electrode.

When the electrode 10 reaches predetermined gap setting, a null condition is established, voltage at 52 equals voltage at 54 and no current flows.

Backup of the electrode is initiated when the voltage at 52 is lower than that at 54, whereupon electron flow, blocked by diode 18, is through [potentiometer] *rheostat* 20, valve control coils 22, 24, and diode 34 to adjusting terminal 24 of potentiometer 38. Additionally, there is shunt flow through diode 26 and [potentiometer] *rheostat* 28, which constitute the backup velocity control.

In a circuit like that just described, it is imperative that some kind of voltage limiting device be provided for the electrode servo. A typical voltage rating for the series valve coils 22, 24, is 5 volts each or 10 volts total. In a typical E.D.M. machine, reference voltage 44 and average gap input voltage stored in condenser 16 will range between 20 and 80 volts for precision equipment and between zero and two or three hundred volts in equipment employing relaxation oscillator circuits.

For example, assume that in the operation of the above described circuit, a short circuit between the electrode and workpiece occurs with the reference point 54 set at 80 volts. There will be then, zero volts across the gap and the full difference of potential, i.e. 80 volts would appear across the coils 22, 24, unless the *rheostats* [potentiometers] 20 and *potentiometer* 38 were in the circuit. Under open circuit conditions, the [potentiometer] *rheostat* 36 functions in conjunction with potentiometer 38 in a similar manner.

With heavy electrodes, the inertia of the power feed servo components becomes important and overtravel of the piston 104, particularly when advancing downwardly, is common unless some means to prevent this is used. The condenser 40 serves to substantially reduce, and in some instances eliminate this overtravel. During a condition of electrode downfeed, electron flow is from terminal 54 through *rheostat* [potentiometer] 36 to coils 22, 24. Thus there is a voltage drop across the *rheostat* [potentiometer] resistor 36 and the condenser 40 will store the sum of this voltage and the voltage existing at point 54. Accordingly, for the period of decay of the voltage stored in the condenser, a higher than normal reference voltage is effective at point 62 in the circuit. This decaying higher reference voltage causes the gap voltage to be momentarily higher than the preset normal gap voltage and the effect is to slow downfeed of the electrode and prevent overtravel which might lead to hunting.

Experience has indicated that for optimum performance, condenser capacity should be chosen such that the time discharge constant will be slightly greater than the mechanical or backlash constant of the machine elements involved. The condenser improves performance of the circuit on backup also, provided that the condenser time constant is not in excess of twenty times that of the machine inertia constant. During backup of the electrode, diode 34 shorts out *rheostat* [potentiometer] 36, and terminal 62 and condenser 40 remain for an appreciable period at the potential of point 54, thus permitting quick recovery after a condition of short circuit.

It will be seen that proper selection of capacity of condenser 40 provides a "gentling" of electrode movement on downfeed and rapid recovery after backup.

Figures 4, 5:
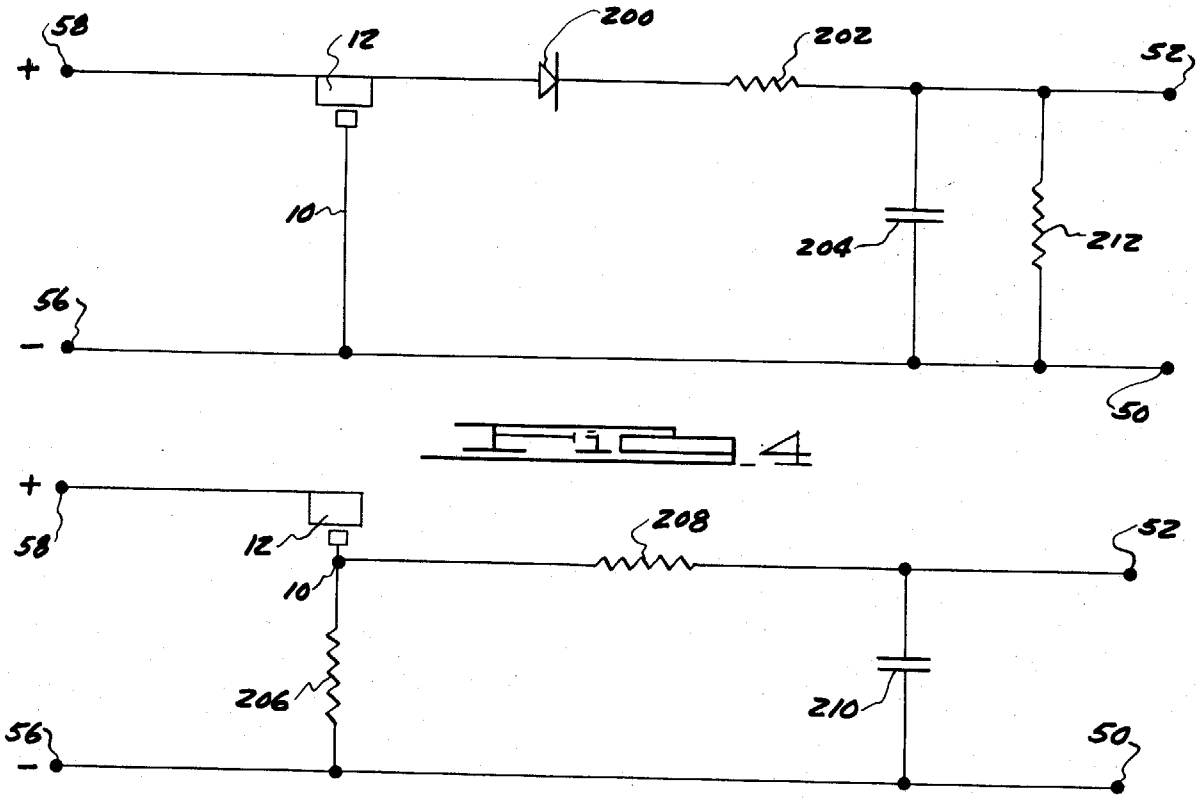
FIG. 4 is a schematic wiring diagram of a modified form of signal input which may be used in connection with the control circuit of FIG. 3.
FIG. 5 is a similar showing of another modification of the signal input.

The control circuit of FIG. 3 is adapted to be used with other types of sensing networks. One example is shown in FIG. 4 in which diode 200 and condenser 204 replace the RC network 14—16 of FIG. 3. In this circuit, the peak gap voltage or striking voltage is stored across condenser 204, instead of the average gap voltage. Resistor 202 is optional as a current surge limiting resistor for diode 200. In any case, the resistor 202 would be much smaller in value than resistor 14 for a network of corresponding capacity.

In the FIG. 4 circuit, the charge on condenser 204 is blocked from the gap by diode 200 and resistor 212 serves to discharge condenser 204 as well as a return for back-up current flowing from voltage source 44 of the power feed control circuit.

FIG. 5 shows another form of gap power input sensing network which senses current flowing in the gap circuit. In this instance, signal resistor 206 is connected in series with the machining gap, and as current flows in the gap circuit, a voltage drop occurs across resistor 206 which is sensed by the RC network 208—210. This RC network is generally of the same magnitude and capacity as the network 14—16 of FIG. 3. Resistor 206 is, of course, of relatively low impedance since the gap loop is subject to heavy current flow.

Thus it can be seen that the basic form of simplified power feed control circuit may be applied to any type of input sensing network. The novelty in each of these cases is the vastly simplified control network in which inexpensive and rugged devices are substituted for normal control components such as vacuum tubes, thyratrons, transistors or other electronic three terminal elements. This novel control circuit is characterized by an extremely low cost of construction as well as long life since no components are of the emission type. The heart of the circuit itself consists of four potentiometers, four diodes, and one condenser, which is fantastically less than other forms of circuitry used to achieve similar results.

If commercially available non-linear potentiometers are used at 28 and 32, excellent control results since voltage magnitudes at terminals 46, 48, depend upon the setting of these potentiometers for either Up or Down velocity. A uniform rotation of either potentiometer will produce a linear reduction in voltage at terminals 46, 48, for the potentiometer corresponding to either Up or Down velocity. In other words, at a mid-point setting of the potentiometer, approximately 50% of the voltage and therefore 50% of the speed setting would exist. This provides excellent machine control.

While I have shown and described the operation of my improved feed control circuit in conjunction with a hydraulically actuated power feed, it is applicable as well to control of an electric motor driven feed system. With an electrically driven feed mechanism, the circuit components would have to be of much heavier wattage capacity, but equally good control may be achieved.

I claim:

1. In combination with electrical discharge machining equipment having means for passing current across a gap between an electrode and a workpiece for eroding the workpiece, servo means for controlling the gap spacing of the electrode and workpiece comprising reversible motive means, an electrically energized element for controlling operation of said motive means, circuit means connected with said gap and said element operable to cause operation of said motive means in response to changes in gap voltage above or below preset machining voltage comprising, a network for sensing [and storing] gap voltage, a first [potentiometer] *variable resistance* connected in series with said network and said element, a diode shunted across said first *variable resistance* [potentiometer permitting electron flow around said first potentiometer from said element to said network], a reference voltage source, a second [potentiometer] *variable resistance* connected in series with said reference voltage and said element, and a diode shunted across said second [potentiometer] *variable resistance* in opposite polarity relationship with respect to said first mentioned diode [permitting electron flow around said second potentiometer from said element to said reference voltage].

2. The combination set forth in claim 1 including a variable resistor and diode in series connected in shunt around said element for shunting a portion of the electron flow during electrode backup.

3. The combination set forth in claim 1 including a variable resistor and diode in series connected in shunt around said element for shunting a portion of the electron flow during electrode downfeed.

4. The combination set forth in claim 1 including a condenser connected [in series with] *across* said reference voltage and said second [potentiometer] *variable resistance and* operable to momentarily store the sum of the voltages across said components during electrode downfeed.

5. In combination with electrical discharge machining equipment having means for passing current across a gap between an electrode and a workpiece for eroding the workpiece, servo means for controlling the gap spacing of the electrode and workpiece comprising reversible motive means, an electrically energized element for controlling operation of said motive means, circuit means connected with said gap and said element operable to cause operation of said motive means in response to changes in gap [voltage] *current* above or below preset machining [voltage] *current* comprising, a network for sensing changes in current flow in the gap, a first [potentiometer] *variable resistance* connected in series with said network and said element, a diode shunted across said first *variable resistance* [potentiometer permitting electron flow around said first potentiometer from said element to said network], a *variable* [reference] voltage source, a second [potentiometer] *variable resistance* connected in series with said reference voltage and said element, and a diode shunted across said second [potentiometer] *variable resistance* in opposite polarity relationship with respect to said first mentioned diode [permitting electron flow around said second potentiometer from said element to said reference voltage].

6. The combination set forth in claim 5 including a variable resistor and diode in series connected in shunt around said element for shunting a portion of the electron flow during electrode backup.

7. The combination set forth in claim 5 including a variable resistor and diode in series connected in shunt around said element for shunting a portion of the electron flow during electrode downfeed.

[8. The combination set forth in claim 5 including a condenser connected in series with said reference voltage and said second potentiometer operable to momentarily store the sum of the voltages across said components during electrode downfeed.]

*9. In combination with electrical discharge machining equipment having means for passing current across a gap between an electrode and a workpiece for eroding the workpiece, servo means for controlling the gap spacing of the electrode and the workpiece comprising reversible motive means, a sensing network responsive to an electrical characteristic of the gap and operative to produce a voltage output representative thereof, a reference voltage, an electrically energized element for controlling operation of said motive means in response to the direction of current flow therethrough, means for defining a first power flow path in one direction through said element between said sensing means and said reference voltage, means for defining a second power flow path in the opposite direction through said element between said sensing means and said voltage, and a power limiting means operatively connected to each of said two last mentioned means.*

*10. The combination as set forth in claim 9 including a means for regulating the speed of operation of said motive means in at least one direction comprising a unilateral current conducting device and a variable resistance connected in series across said element.*

*11. In combination with electrical discharge machining equipment having means for passing current across a gap between an electrode and a workpiece for eroding the workpiece, servo means for controlling the gap spacing of the electrode and workpiece comprising reversible motive means, a sensing network connected to the gap circuit and operative to provide a voltage output representative of an electrical characteristic of the gap, a reference voltage source, an electrically energized element connected between said sensing network and said reference voltage source for controlling operation of said motive means in response to direction of current flow through said element, a first means for providing a unidirectional, variable impedance power flow path from said source through said element to said network when said reference voltage is higher than the voltage of said network, and a second means for providing a unidirectional, variable impedance power flow path from said network through said element to said source when said network voltage is higher than said reference voltage.*

*12. The combination as set forth in claim 11 in which a condenser is connected between one terminal of said voltage source and the terminal of said second means proximate said element.*

*13. The combination as set forth in claim 11 in which said sensing network comprises a diode and a capacitor serially connected across the gap for sensing gap striking voltage.*

*14. The combination as set forth in claim 11 in which said sensing network comprises a signal resistor and a capacitor serially connected across the gap.*

*15. In combination with electrical discharge machining equipment having means for passing current across a gap between an electrode and a workpiece for eroding the*

*workpiece, servo means for controlling the gap spacing of the electrode and workpiece comprising reversible motive means, a sensing network connected to the gap circuit and operative to provide a voltage output representative of an electrical characteristic of the gap, a variable reference voltage source, an electrically energized element connected between said sensing network and said reference voltage source for controlling operation of said motive means in response to direction of current flow through said element, a first diode and a first variable impedance shunt connected and coupled between said sensing network and one terminal of said element, a second diode oppositely poled from said first diode and a second variable impedance shunt connected and coupled between the other terminal of said element and said reference voltage source.*

*16. In combination with electrical discharge machining equipment having means for passing current across a gap between an electrode and a workpiece for eroding the workpiece, servo means for controlling the gap spacing of the electrode and workpiece comprising reversible motive means, a sensing network connected to the gap circuit and operative to provide a voltage output representative of an electrical characteristic of the gap, a variable reference voltage source, an electrically energized element connected between said sensing network and said reference voltage source for controlling operation of said motive means in response to direction of current flow through said element, a first means for providing a unidirectional, variable impedance power flow between said network and said element, and a second means for providing a unidirectional, variable impedance power flow from said reference voltage source to said element.*

*17. A closed loop servo system for a controlled state device including reversible motive means comprising a sensing network operable to provide a variable voltage output characteristic of the state of the device, a variable reference voltage source, an electrically energized element connected between said sensing network and said source, for controlling operation of said motive means in response to direction of power flow through said element, a first means for providing a unidirectional, variable impedance power flow from said source through said element to said network when said reference voltage is higher than the voltage of said network, and a second means for providing a unidirectional, variable impedance power flow path from said network to said source when said network voltage is higher than said reference voltage.*

*18. In combination with electrical discharge equipment having means for passing current across a gap between an electrode and a workpiece for eroding the workpiece, servo means for controlling the gap spacing of the electrode and workpiece comprising reversible motive means, a sensing network responsive to an electrical characteristic of the gap and operative to provide a voltage output representative thereof, a reference voltage, an electrically energized element connected between said sensing network and said reference voltage source for controlling operation of said motive means in response to direction of power flow through said element, a pair of opposite polarity diodes, each connected between said network and said source to provide opposite direction power flow paths therebetween, and a variable resistance connected in shunt with each of said diodes.*

*19. The combination as set forth in claim 18 including a means for regulating the speed of operation of said motive means in at least one direction comprising a diode and a variable resistance connected in series across said element.*

*20. In combination with electrical discharge machining equipment having means for passing current across a gap between an electrode and a workpiece for eroding the workpiece, servo means for controlling the gap spacing of the electrode and workpiece comprising reversible motive means, a sensing network connected to the gap circuit and operable to provide a voltage output representative of gap voltage, a variable reference voltage source, an electrically energized element connected between said sensing network and said reference voltage source for controlling operation of said motive means in response to direction of current flow through said element, a first means for providing a unidirectional, variable impedance power flow between said network and said element, a second means for providing a unidirectional, variable impedance power flow from said reference voltage source to said element, and a control means for selectively presetting the magnitude of said reference voltage source and proportionally decreasing and increasing the effective value of said first and second impedances between said sensing network and said element and between said voltage source and said element, respectively.*

*21. In combination with electrical discharge machining equipment having means for passing current across a gap between an electrode and a workpiece for eroding the workpiece, servo means for controlling the gap spacing of the electrode and workpiece comprising reversible motive means, a sensing network connected to the gap circuit and operable to provide a voltage output representative of gap current, a variable reference voltage source, an electrically energized element connected between said sensing network and said reference voltage source for controlling operation of said motive means in response to direction of current flow through said element, a first means for providing a unidirectional, variable impedance power flow between said network and said element, a second means for providing a unidirectional, variable impedance power flow from said reference voltage source to said element, and a control means for selectively presetting the magnitude of said reference voltage source and proportionally decreasing and increasing the effective value of said first and second impedances between said sensing network and said element and between said voltage source and said element, respectively.*

*22. In combination with electrical discharge machining equipment having means for passing current across a gap between an electrode and a workpiece for eroding the workpiece, servo means for controlling the gap spacing of the electrode and the workpiece comprising reversible motive means, a sensing network responsive to an electrical characteristic of the gap and operative to produce a voltage output representative thereof, a variable reference voltage, an electrically energized element for controlling operation of said motive means in response to the direction of current flow therethrough, means for defining a first power flow path in one direction through said element between said sensing means and said reference voltage, means for defining a second power flow path in the opposite direction through said element between said sensing means and said reference voltage, a power limiting means operatively connected to each of said two last mentioned means, and a control means for varying the magnitude of said reference voltage and inversely varying the magnitude of said power limiting means with respect to each other.*

*23. In combination with electrical discharge machining equipment having means for passing current across a gap between an electrode and a workpiece for eroding the workpiece, servo means for controlling the gap spacing of the electrode and workpiece comprising reversible motive means, a sensing network connected to the gap circuit and operative to provide a voltage output representative of an electrical characteristic of the gap, a variable reference voltage source, an electrically energized element connected between said sensing network and said reference voltage source for controlling operation of said motive means in response to direction of current flow through said element, a first means for providing a unidirectional, variable impedance power flow path from*

*said source through said element to said network, a second means for providing a unidirectional, variable impedance power flow path from said network through said element to said source when said network voltage is higher than said reference voltage, and control means conjointly operable to preset selectively the magnitude of said reference voltage source, to increase the impedance of one of said means and to decrease proportionately the impedance of the other of said means.*

*24. In combination with electrical discharge machining equipment having means for passing current across a gap between an electrode and a workpiece for eroding the workpiece, servo means for controlling the gap spacing of the electrode and workpiece comprising reversible motive means, a sensing network connected to the gap circuit and operative to provide a voltage output representative of an electrical characteristic of the gap, a variable reference voltage, an electrically energized element connected between said sensing network and said reference voltage for controlling operation of said motive means in response to direction of current flow through said element, a first means for providing a unidirectional, variable impedance power flow between said sensing network and said element, a second means for providing a unidirectional, variable impedance power flow from said reference voltage to said element, and control means for selectively presetting the magnitude of said reference voltage and proportionally decreasing and increasing the effective value of said first and second impedances between said sensing*

*network and said element and between said reference voltage and said element, respectively.*

*25. A closed loop servo system for a controlled state device including reversible motive means comprising a sensing network operable to provide a variable voltage output characteristic of the state of the device, a variable reference voltage, an electrically energized element connected between said sensing network and said reference voltage for controlling operation of said motive means in response to direction of power flow through said element, a first means for providing a unidirectional, variable impedance power flow from said reference voltage through said element to said network when said reference voltage is higher than the voltage of said network, a second means for providing a unidirectional, variable impedance power flow path from said network to said reference voltage when said network voltage is higher than said reference voltage, and control means conjointly operable to preset selectively the magnitude of said reference voltage, to increase the impedance of one of said means and to decrease proportionately the impedance of the other of said means.*

References Cited in the file of this patent or the original patent

UNITED STATES PATENTS

| | | |
|---|---|---|
| 2,927,191 | Matulaitis | Mar. 1, 1960 |
| 2,939,065 | Matulaitis | May 31, 1960 |